United States Patent [19]

Tomita et al.

[11] Patent Number: 4,745,817

[45] Date of Patent: May 24, 1988

[54] PISTON/CRANK CONNECTION MECHANISM FOR AN INTERNAL COMBUSTION ENGINE

[75] Inventors: Takao Tomita; Takahumi Asakura, both of Saitama, Japan

[73] Assignee: Honda Giken Kogyo Kabushiki Kaisha, Tokyo, Japan

[21] Appl. No.: 734,875

[22] Filed: Jun. 14, 1985

Related U.S. Application Data

[63] Continuation-in-part of Ser. No. 408,287, Aug. 16, 1982, abandoned.

[30] Foreign Application Priority Data

Aug. 18, 1981 [JP] Japan .................. 56-121982

[51] Int. Cl.⁴ ............ G05G 1/00; F02B 75/32
[52] U.S. Cl. ............... 74/579 E; 123/197 AB; 74/579 R
[58] Field of Search .......... 308/9; 74/579 E, 579 R; 123/197 AB, 197 AL, 197 AC; 29/156.5 A; 464/68

[56] References Cited

U.S. PATENT DOCUMENTS

| | | | |
|---|---|---|---|
| 1,921,044 | 8/1933 | Sparrow | 74/579 E |
| 1,924,326 | 8/1933 | MacFadden | 74/579 E |
| 1,939,959 | 12/1933 | Dick | 403/154 |
| 2,311,434 | 2/1943 | Dusevoir | 308/74 |
| 2,344,275 | 3/1944 | Straub | 74/579 E |
| 2,860,016 | 11/1958 | Swart | 74/579 E |
| 3,545,415 | 12/1970 | Yoshio | 123/90 |
| 3,641,990 | 2/1972 | Kinnersly | 123/196 R |
| 3,860,367 | 1/1975 | Telang et al. | 418/178 |
| 3,983,270 | 9/1976 | Licari et al. | 427/372 |
| 4,136,211 | 1/1979 | Sliney | 427/34 |
| 4,225,295 | 9/1980 | Shimizu et al. | 418/142 |
| 4,269,083 | 5/1981 | Wandel | 74/579 E |
| 4,284,658 | 8/1981 | Davis et al. | 427/34 |
| 4,293,136 | 10/1981 | George | 74/574 |
| 4,512,290 | 4/1985 | Ficht et al. | 123/197 AC |
| 4,547,434 | 10/1985 | Sumiyoshi et al. | 74/579 R |
| 4,560,054 | 12/1985 | Kayanoki et al. | 464/68 |
| 4,584,893 | 4/1986 | Harding et al. | 74/422 |

FOREIGN PATENT DOCUMENTS

| | | | |
|---|---|---|---|
| 1210263 | 2/1966 | Fed. Rep. of Germany | 74/579 E |
| 119811 | 6/1986 | Japan | 74/579 E |
| 695195 | 8/1953 | United Kingdom | 308/DIG. 9 |
| 706795 | 4/1954 | United Kingdom | 308/DIG. 9 |
| 866462 | 4/1961 | United Kingdom | 74/501 R |
| 554172 | 5/1977 | U.S.S.R. | 74/579 E |

OTHER PUBLICATIONS

Handbook of Tables for Applied Engineering Science, 2nd Edition, CRC Press, Library of Congress Catalog #75-117044; pp. 614, 621-627.

*Primary Examiner*—Gary L. Smith
*Assistant Examiner*—Vinh Luong
*Attorney, Agent, or Firm*—Irving M. Weiner; Joseph P. Carrier; Pamela S. Burt

[57] ABSTRACT

A piston/crank connection mechanism for an internal combustion engine, including first and second pin members mounted on a piston and a crank of the engine, respectively, a connecting rod member having formed at opposite ends thereof first and second fitting holes in which the first and second pin members are fitted, respectively, and a self-lubricating, heat-resisting, wear-resisting and relatively hard film layer having a slippery surface thereon and interposed between an outer peripheral portion of the first pin member and an inner peripheral portion of the first fitting hole in the connecting rod. The structure eliminates any need for further consideration with respect to lubrication between the pin members and the connecting rod member, provides for reduction in size and weight of an engine, and is advantageous in controlling vibrations and noises.

3 Claims, 2 Drawing Sheets

PISTON/CRANK CONNECTION MECHANISM FOR AN INTERNAL COMBUSTION ENGINE

This is a continuation-in-part of application Ser. No. 408,287 filed Aug. 16, 1982 now abandoned.

BACKGROUND OF THE INVENTION

1. Field of the Invention

The present invention relates generally to a piston/crank connection mechanism for an internal combustion engine. More particularly, the invention relates to a piston/crank connection mechanism for an internal combustion engine of the type having a piston and a crank, which mechanism includes a connecting rod member having opposite ends thereof pivotably mounted on the piston and the crank, respectively, each by means of a pin.

2. Description of Relevant Art

A known piston/crank connection mechanism in an internal combustion engine having a piston and a crank includes a connecting rod member having opposite ends thereof pivotably mounted on the piston and the crank, respectively, each by means of a pin.

A conventional piston/crank connection mechanism in such an internal combustion engine, particularly in a two cycle reciprocating internal combustion engine, includes a needle bearing interposed between each pin member and the connecting rod member in view of the heat characteristic thereof. Such arrangement, however, is disadvantageous in that it further requires consideration with respect to lubrication between the pin members and the connecting rod member, which necessarily makes the structure relatively complicated, resulting in an increase in size and weight, and disadvantages with regard to controlling vibrations and noises of the system.

The present invention effectively overcomes the foregoing disadvantages attendant the conventional piston/crank connection mechanism in an internal combustion engine.

SUMMARY OF THE INVENTION

The present invention provides a piston/crank connection mechanism for an internal combustion engine having a piston and a crank, comprising: first and second pin members mounted on the piston and the crank, respectively; a connecting rod member having formed at opposite ends thereof first and second fitting holes in which the first and second pin members are fitted, respectively; and at least one self-lubricating, heat-resisting, wear-resisting and relatively hard film layer having a slippery surface and interposed at least between an outer peripheral portion of the first and an inner peripheral portion of the first fitting hole in the connecting rod.

It is an object of the present invention to provide, for an internal combustion engine of the type having a piston and a crank, a piston/crank connection mechanism which, although it comprises a connecting rod member having opposite ends thereof pivotably mounted on the piston and the crank, respectively, each by means of a pin, substantially eliminates any need for further consideration with respect to lubrication between the pin members and the connecting rod and which has a relatively simplified structure so as to be reduced in size and weight, and is advantageous in controlling vibrations and noises of the engine.

The above and further objects, details and advantages of the present invention will becomes apparent from the following detailed description, when read in conjunction with the accompanying drawings.

DETAILED DESCRIPTION OF PREFERRED EMBODIMENTS

Figure 1:
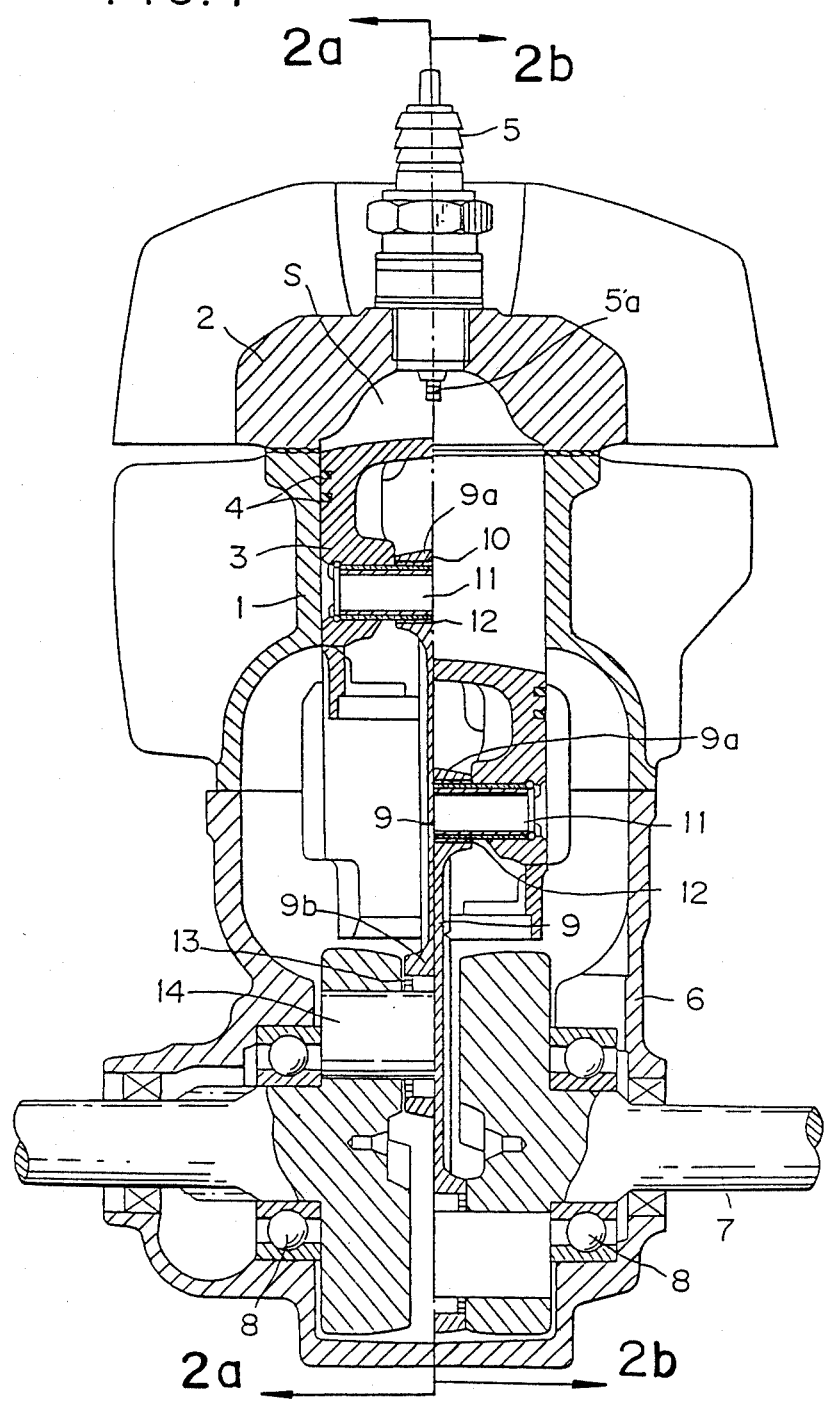
FIG. 1 is a cross sectional view of an internal combustion engine having a piston/crank connection mechanism in accordance with a preferred embodiment of the present invention, the left and right half sections thereof showing conditions of the engine when the piston is in top and bottom limit positions, respectively.
Figure 2:
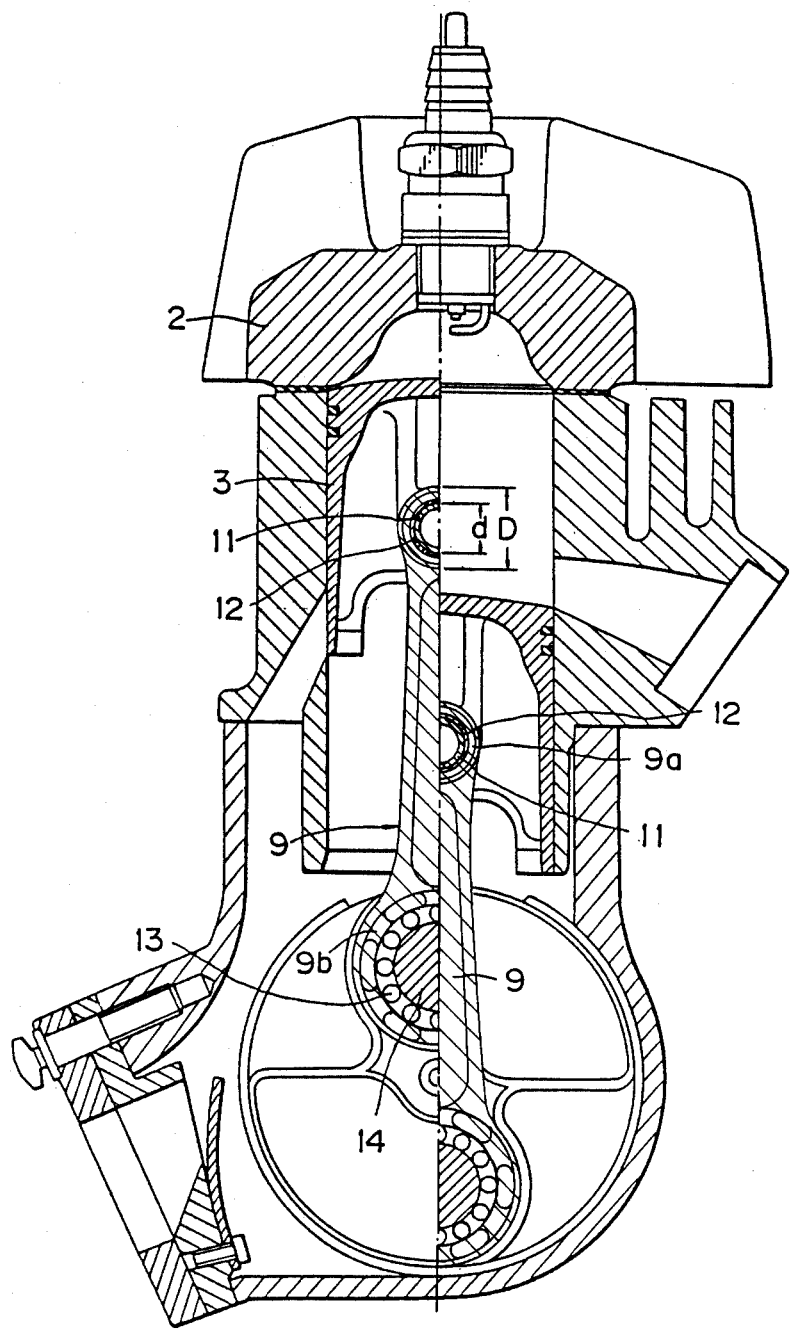
FIG. 2 is a view similar to FIG. 1, with left and right half sections thereof being taken along lines 2a—2a and 2b—2b, respectively, of FIG. 1.

With reference to FIGS. 1 and 2, there is shown atwo-cycle internal combustion engine which includes a cylinder 1 and a cylinder head 2. A piston 3 is fitted in the cylinder 1 for up and down sliding movement in an air tight relationship by means of two piston rings 4. A combustion chamber S is defined by the cylinder 1, the cylinder head 2 and the piston 3 and has a substantially semispherical upper half defined by an upper wall of the cylinder head 2. An ignition plug 5 is disposed in a central portion of the cylinder head 2 and has an igniting portion 5a extending into the combustion chamber S.

A crankshaft 7 extends substantially horizontally through a lower part of a crankcase 6 and is supported for rotation by means of ball bearings 8. The crankshaft 7 is connected to the piston 3 by means of a connecting rod 9. The connecting rod 9 has a minor end 9a having a fitting hole 10 formed therein, with a piston pin 11 extending through the hole 10 to connect the connecting rod 9 to the piston 3 for pivotal motion around the piston pin 11, as shown in FIG. 1. An inner peripheral surface of the fitting hole 10 formed in the connecting rod minor end 9a is directly coated with a thin (10 to 20 microns), self-lubricating, heat-resisting, wear-resisting, relatively hard film layer 12 having a slippery surface thereon, such as for example, a synergistic film layer which is made of a compound of nickel phosphor alloy and fluorine resin. It is to be noted that such film layer 12 may alternatively be coated on an outer peripheral surface of the piston pin 11, or separate film layers may be coated on the inner peripheral surface of the fitting hole 10 in the connecting rod minor end 9a and on the outer peripheral surface of the piston pin 11, as shown in FIG. 1. A major end 9b of the connecting rod 9 is connected to the crankshaft 7 for rotation by means of a needle bearing 13 and a crank pin 14 fitted therein.

During the operation of the engine, the piston 3 moves in an up and down linear motion within the cylinder 1 while the crankshaft 7 moves in a rotational motion. Thus, the minor end 9a of the connecting rod 9 which connects piston 3 and the crankshaft 7 to each other moves in a linear motion while the major end 9b moves in a rotational motion so that an intermediate portion between both ends 9a and 9b moves in a composite motion of such linear and rotational motions.

As described hereinabove, the arrangement comprises a thin film layer 12 interposed between the minor end 9a of the connecting rod 9 and the piston pin 11. Accordingly, the arrangement provides a design in which an outer diameter D (FIG. 2) of connecting rod minor end 9a relative to an outer diameter d of piston pin 11 can be reduced in comparison with a conventional arrangement, and thus the total weight of the connecting rod 9 can be reduced. Such reduction of the weight of the connecting rod 9 results in reduction of the inertial mass for movement of the connecting rod 9, which is advantageous in controlling vibrations and noises of the engine.

It is to be noted that, while the preferred embodiment described hereinabove employs a needle bearing 13 interposed in the coupling of the connecting rod 9 to the crank pin 14, such coupling of the connecting rod 9 to the crank pin 14 may also include a synergistic film layer as described hereinabove, or the like, coated on a surface of at least one of the connecting rod 9 and the crank pin 14 (FIG. 2), thereby reducing the weight of such components so as to attain advantages similar to those described hereinabove.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing invention.

We claim:

1. A piston/crank connection mechanism for a two cycle reciprocating internal combustion engine having a piston and a crank, comprising:
   first and second pin members mounted on said piston and said crank, respectively;
   said first pin member being disposed in parallel with an axis of a crankshaft of said engine;
   a connecting rod member formed at opposite ends thereof first and second fitting holes in which said first and second pin members are fitted, respectively; and
   at least one self-lubricating, heat-resisting, wear-resisting and relatively hard film layer having a slippery surface thereon and directly coated on an outer peripheral portion of said first pin member wherein said film layer is fabricated of a compound of nickel phosphor alloy and fluorine resin:

2. A piston/crank connection mechanism for a two cycle reciprocating internal combustion engine having a piston and a crank, comprising:
   first and second pin members mounted on said piston and said crank, respectively;
   said first pin member being disposed in parallel with an axis of a crankshaft of said engine;
   a connecting rod member having formed at opposite ends thereof first and second fitting holes in which said first and second pin members are fitted, respectively; and
   at least one self-lubricating, heat-resisting, wear-resisting and relatively hard film layer having a slippery surface thereon and directly coated on an inner peripheral portion of said first fitting hole in said connecting rod wherein said film layer is fabricated of a compound of nickel phosphor alloy and fluorine resin.

3. A piston/crank connection mechanism for a two cycle reciprocating internal combustion engine having a piston and a crank, comprising:
   first and second pin members mounted on said piston and said crank, respectively;
   said first pin member being disposed in parallel with an axis of a crankshaft of said engine;
   a connecting rod member having formed at opposite ends thereof first and second fitting holes in which said first and second pin members are fitted, respectively; and
   at least two self-lubricating, heat-resisting, wear-resisting and relatively hard film layers each having a slippery surface thereon, one of said film layers being directly coated on an inner peripheral portion of said first pin member and one of said film layers being directly coated on an inner peripheral portion of said first fitting hole in said connecting rod wherein said film layer is fabricated of a compound of nickel phosphor alloy and fluorine resin.

* * * * *

UNITED STATES PATENT AND TRADEMARK OFFICE
CERTIFICATE OF CORRECTION

PATENT NO. : 4,745,817

DATED : May 24, 1988

INVENTOR(S) : Tomita et al.

It is certified that error appears in the above-identified patent and that said Letters Patent is hereby corrected as shown below:

```
Column 1, line 54, after "first" insert --pin--.
Column 2, line 20, change "atwo-cycle" to --a
two-cycle--.
Column 3, line 27, change "invention" to --description--.
Column 3, line 36 (claim 1, line 8), after "member"
insert --having--.
Column 4, line 3 (claim 1, line 17), after "resin" change
the colon to a period.
Column 4, line 36 (claim 3, line 15), change "inner" to
--outer--.
```

Signed and Sealed this

Twenty-seventh Day of September, 1988

Attest:

DONALD J. QUIGG

Attesting Officer

Commissioner of Patents and Trademarks